Patented July 11, 1950

2,514,621

UNITED STATES PATENT OFFICE 2,514,621

INSECTICIDAL COMPOSITIONS COMPRISING EITHER HEXYL ALKYL TETRAPHOSPHATE OR TETRA-ALKYL PYROPHOSPHATE AND EITHER AN ALKALI-METAL FLUORIDE OR FLUOROSILICATE

Alan Bell, Kingsport, Tenn., assignor to Eastman Kodak Company, Rochester, N. Y., a corporation of New Jersey No Drawing. Application December 26, 1946, Serial No. 718,613

8 Claims. (Cl. 167—17)

This invention relates to insecticides having increased longevity. More particularly this invention concerns procedure for increasing the longevity of phosphorus-containing insecticides and the improved insecticides resulting therefrom.

In recent years a number of new insecticides have been developed among which may be mentioned DDT and Bladan, the latter being a German development. Also the latter type of insecticide comprises compounds containing phosphorus, and it is with this phosphorus-containing type of insecticide that the present invention is primarily concerned. These phosphorus-containing insecticides which are at present available are stated to be prepared by various methods such as by the reaction of trialkyl phosphates with phorphorus oxychloride. Also phosphorus-containing insecticides of the class described are prepared from the reaction of trialkyl phosphates and phosphorus pentoxide. Certain of these phosphorus-containing insecticides are stated to comprise hexaesters of tetraphosphoric acid or similar phosphoric acid. However, for the purposes of the present invention the exact chemical structure of the particular phosphorus-containing insecticide is not material, it being sufficient merely to refer to the entire class of existing insecticides, such as Bladan, as phosphorus-containing insecticides.

In my companion copending application Serial No. 718,612, now Patent 2,495,220, I have described certain improved phosphorus-containing insecticides derived from the reaction of certain organic phosphates such as triethyl phosphate with sulfur acid halides such as thionyl chloride. Also disclosed in my companion copending applications, Serial Nos. 718,616 and 718,615, now Patent 2,508,364, are other phosphorus-containing insecticides such as those resulting from the reaction of alkyl phosphate with phosphorus tri- and penta-halides. There are also insecticides disclosed wherein phosphites are used in their preparation.

It is sufficient for the purposes of the present invention to state that at the present time there are outstanding a number of organic insecticides of the classes indicated, which for the purposes of description will all be generically referred to as phorphorus-containing insecticides, and that such insecticides may have varying degrees of toxicity when toxicity is measured within the span of a few hours.

That is, all of these insecticides, prior to my invention described herein, while giving a kill within a short time after they are made up into an insecticide for use, such as with bran bait, a spray, or the like, have had the property in some instances that they may become nontoxic after a short period of time. While in certain instances it may be desired to use an insecticide which is toxic for a period of only a few hours and the above insecticides may be so used, there are other instances when it is desired that the toxicity of the insecticide exist for a longer period. Presumably one reason why the aforementioned phosphorus-containing insecticides lose their toxicity is because of hydrolysis. As will be shown in detail hereinafter, the toxicity of any of the above compounds usually may be destroyed by boiling or other treatment producing hydrolysis.

Therefore, it is apparent that for practical field use under the conditions of atmospheric moisture or, for example, for use immediately following rain it may be highly desirable that an insecticide of the class indicated be prepared which possesses toxicity in the presence of moisture. That is, in practical use it might be desirable to spray, dust, or otherwise apply insecticides immediately after rain storms and the improved insecticides of the present invention are particularly efficacious for use where it is desired to maintain toxicity for a relatively longer period even under conditions where there is sufficient moisture present for causing hydrolysis and normally destroying the toxicity of existing phosphorus-containing insecticides.

I have found that insecticides of the class described, whether they be the existing hexaesters or the like, or the more potent materials described in my companions applications Serial Nos. 718,-612, 718,615 and 718,616 having several times the toxicity of the first-mentioned insecticides, may have incorporated therewith certain other chemical components whereby the longevity of the insecticide is substantially increased. By the control of the addition and other factors the toxicity of the insecticide may be predetermined so that that insecticide will not only give instantaneous kill but the killing effect may be extended over a longer period even under conditions of extreme moisture or wetness.

This invention has for one object to provide a method of increasing the longevity of certain organic insecticides and an improved insecticide composition resulting therefrom. Another object is to provide certain special phosphorus-containing insecticides of increased longevity. A still further object is to provide insecticides of the class described, which heretofore have been prone to lose their toxicity in the presence of moisture but in accordance with the present invention their toxicity may be retained or maintained even under conditions which normally would produce loss of toxicity. Still a further object is to provide a novel combination insecticide which includes both inorganic and organic insecticidal components. Still another object is to provide a method of improving phosphorus-containing insecticides by the incorporation therewith of water-soluble inorganic insecticides containing fluorine. A still further object is to provide aqueous sprays of other insecticidal compositions containing moisture or water made up from phosphorus-containing insecticides of the class indicated which sprays or the like have increased longevity. Still another object is to provide a superior insecticide of increased longevity which includes in its composition a water-soluble halogen compound and a highly toxic phosphorus-containing compound.

Other objects will appear hereinafter.

I have found that organic insecticides of the class described which are unstable and prone to lose their toxicity in the presence of moisture and particularly phosphorus-containing insecticides described in detail above may be substantially improved and their toxic longevity increased by the incorporation therewith of small amounts of one or more water-soluble insecticides. More particularly I have found that phosphorus-containing insecticides may be substantially improved by the incorporation therewith of an inorganic insecticide such as sodium fluorosilicate, sodium fluoride, and the like as will be described in detail hereinafter.

In general the use of a fraction of a percent of the water-soluble inorganic insecticide is sufficient. However, several percent may be employed if desired. In general the concentration of the inorganic insecticide added in accordance with the present invention may not be enough to harm the insect if used alone. However, I have found that when this small amount of inorganic insecticide is used in combination with the organic insecticide of the class indicated that the toxic longevity of the resultant combination is substantially greater than the organic insecticide alone and that it otherwise possesses numerous advantages.

While I do not wish to be bound by any theory concerning the mechanism of the reaction of my invention, it may be that the effect produced by the addition of inorganic insecticides is a synergism and stabilizing causing even small quantities of the phosphorus insecticide to produce a kill over extended periods.

A further understanding of my invention will be had by a consideration of the examples which follow which examples are set forth for illustrating the preferred embodiment of my invention and are not to be construed as a limitation except insofar as is necessitated by the prior art and the spirit of the claims attached to the present specification.

The tests showing the effect of the present invention were carried out on grasshoppers, roaches, and the like common insects. For the purposes of illustration described below are three materials A, B, and C, essentially comprised of 1 cc. of a solution, described in detail below, mixed with 1 gram of bran.

A. This material comprised about 0.1 gram of phosphorus-containing insecticide obtained by reaction of triethyl phosphate with thionyl chloride as described in my companion application. This particular organic insecticide was several times as toxic as the organic insecticide obtained by reacting phosphorus pentoxide with triethyl phosphate, although the latter may also be employed in the present invention. The 0.1 gram was dissolved in 40 cc. of water. One cc. of solution A was mixed with bran. This particular material A, not containing any inorganic insecticide, may be regarded as a control or comparison sample.

B. This material comprised 0.1 gram of phosphorus-containing insecticide derived from the reaction of triethyl phosphate and thionylchloride as in A. Likewise, as in A, this 0.1 gram was dissolved in 40 cc. of water. One cc. of solution was mixed with bran. However, in addition there was added to the 40 cc. solution, 0.3 gram of sodium fluorosilicate.

C. The material in this instance was the same as the preceding in that it comprises 0.1 gram of the triethylphosphate-thionyl chloride reaction product described, dissolved in 40 cc. of water. One cc. was mixed with bran. However, in addition there was incorporated therewith 0.3 gram of sodium fluoride.

EXAMPLE I

Materials A and B, mixed with bran using 1 cc. per gram of bran as indicated, were fed to grasshoppers. The bran mixture was left exposed to the air prior to feeding to the grasshoppers. The bran mixture, left exposed to the air, was fed to grasshoppers to test the toxicity at intervals of 0, 8, 21, 45, and 75 hours and the following results noted:

| Material | Time to Kill After Mixture Prepared | | | | |
|---|---|---|---|---|---|
|  | 0 hrs. | 8 hrs. | 21 hrs. | 45 hrs. | 75 hrs. |
| A | Min. 9 |  | Min. 90 | no kill |  |
| B | Min. 5 | Min. 8 | 30 | 75 min. | no kill. |

The above table indicates the effectiveness of added sodium fluorosilicate in extending the longevity of the phosphorus containing insecticide.

EXAMPLE II

A above was boiled for 1 hour, then mixed with bran and fed to grasshoopers. This mixture was not toxic and did not kill.

Thereafter 0.3 gram of $Na_2SiF_6$ is added to 40 cc. of solution A which had been boiled for 1 hour and mixed with bran. This material killed the grasshoppers in 20 minutes.

EXAMPLE III

Solution A was allowed to stand at room temperature for 48 hours. At the end of this time it is nontoxic to grasshoppers.

Thereafter 0.1 gram of $Na_2SiF_6$ was added to 10 cc. of this solution and mixed with 10 grams of bran. This killed within 38 minutes.

Thereafter 0.1 gram of NaF was added to 10 cc. of this solution and mixed with 10 grams of bran. This likewise killed within 38 minutes.

EXAMPLE IV

Materials A, B, and C were prepared mixed with bran, stored for 20 hours in a stoppered bottle and then fed to grasshoppers.

Mixture A—No kill
Mixture B—Killed in 21 minutes
Mixture C—Killed in 39 minutes

EXAMPLE V

Solutions A, B, and C were prepared and allowed to remain at room temperature. At intervals of 0, 24, 48, 96 hours samples of the solutions were mixed with bran and fed to grasshoppers. The results are given in the following table:

| Material | 0 hrs. | 24 hrs. | 48 hrs. | 96 hrs. |
|---|---|---|---|---|
|  | Min. |  | Min. |  |
| A | 24 | no kill |  | no kill. |
| B | 10 | 23 min | 60 | no kill. |
| C | 7 | 12 min | 28 | 80 min. |

EXAMPLE VI

The following different type materials were prepared in a manner similar to the preceding preparations:

$A^1$. Approximately 0.1 gram of diethylpropylphosphate-thionyl chloride reaction product was dissolved in 40 cc. of water.

$B^1$. Approximately 0.1 gram of diethylpropylphosphate reaction product as above and 0.3 gram of $Na_2SiF_6$ was dissolved in 40 cc. of water.

$C^1$. Approximately 0.1 gram of diethylpropylphosphate reaction product as above and 0.3 gram of NaF was dissolved in 40 cc. of water.

Solutions $A^1$ and $B^1$ were mixed with bran, left exposed to the air and tested with grasshoppers at 0 and 24 hours. The kill time is given in the following table:

| Material | 0 hrs. | 24 hrs. |
|---|---|---|
|  | Min. | Min. |
| $A^1$ | 13 | 120 |
| $B^1$ | 7 | 31 |

Solutions $A^1$, $B^1$, and $C^1$ were left for 24 hours at room temperature, then mixed with bran and tested. The kill time is given in the following table:

| Material | Time |
|---|---|
|  | Min. |
| $A^1$ | 120 |
| $B^1$ | 15 |
| $C^1$ | 17 |

EXAMPLE VII

The material used in this example was a product prepared from trimethylphosphate and thionylchloride. Solutions $A^2$, $B^2$, and $C^2$ were prepared as in Example I except this trimethyl phosphate reaction product was substituted for the triethylphosphate reaction product of Example I. Two hours after the solutions were prepared they were mixed with bran and fed to grasshoppers. The time for complete kill is listed:

| Material | Time |
|---|---|
| $A^2$ | No kill. |
| $B^2$ | 6 min. |
| $C^2$ | 6 min. |

EXAMPLE VIII

This example is similar to Example V except that smaller concentrations of NaF and $Na_2SiF_6$ were used.

Solution $A^3$ 0.1 cc. of organic insecticide derived from triethyl phosphate-thionyl chloride reaction product.
0.1 gm. $Na_2SiF_6$
40 cc. of water

Solution $B^3$

Same as B above except that 80 cc. of $H_2O$ were used.

Solution $C^3$ 0.2 cc. of organic insecticide derived from triethyl phosphate-thionyl chloride reaction product.
0.1 gm. $Na_2SiF_6$
160 cc. of water.

Solution $D^3$ 0.4 cc. of organic insecticide derived from triethyl phosphate-thionyl chloride reaction product.
0.1 gm. $Na_2SiF_6$
320 cc. of water E, F, G, H are the same as $A^3$, $B^3$, $C^3$, $D^3$ except that sodium fluoride was used in place of fluorosilicate.

I comprised 0.1 cc. of organic insecticide derived from triethyl phosphate-thionyl chloride reaction product in 80 cc. of $H_2O$.

These materials were left at room temperature and at intervals of 24, 48, 144, and 168 hours were mixed with bran (1 cc. to 1 gram) and fed to grasshoppers. The number of minutes required to kill are listed in the following table.

| Material | 24 hours | 48 hours | 144 hours | 168 hours |
|---|---|---|---|---|
|  | Minutes |  |  |  |
| $A^3$ | 14 | 60 min | No effect after 4 hours. |  |
| $B^3$ | 12 | 19 min | No effect after 4 hours. |  |
| $C^3$ | 22 | 34 min | No effect after 4 hours. |  |
| $D^3$ | 14 | 26 min | No effect after 4 hours. |  |
| E | 5 | 8 min |  | 40 |
| F | 5 | 11 min |  | 14 |
| G | 9 | 16 min | 37 |  |
| H | 11 | 12 min | 64 |  |
| I | 240 | No kill |  |  |

Solutions E, F, G, H were used effectively as sprays against grasshoppers to prove their use as a contact poison as well as a stomach poison.

Materials E and F were tested 168 hours after preparation and G and H 144 hours after preparation. The results are listed in minutes required to kill.

| Material | Time |
|---|---|
|  | Min. |
| E | 23 |
| F | 20 |
| G | 12 |
| H | 25 |

EXAMPLE IX

The following solution was prepared containing sodium cyanide:

0.2 cc. of organic insecticide derived from triethyl phosphate-thionyl chloride reaction product
0.1 gm. sodium cyanide
160 cc. of water The solution was allowed to stand for 24 hours, mixed with bran, and fed to grasshoppers. It required only two minutes for the kill. This solution did not appear to have the great longevity of a solution containing sodium fluoride, since at the end of 120 hours it required a longer time for the kill.

EXAMPLE X

The insecticide used in this example was that prepared from $SOCl_2$ and triethyl phosphite described in my companion applications. The probable structure of the organic insecticide is:

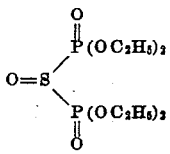

The following solutions were prepared from this insecticide and after 48 hours were mixed with bran and fed to grasshoppers.

$A^4$ Approximately 0.1 cc. of insecticide in 40 cc. water
$B^4$ Solution A+0.3 gm. $Na_2SiF_6$
$C^4$ Solution A+0.3 gm. NaF Results:

| Material | Time |
| --- | --- |
| $A^4$ | No effect after three hours. |
| $B^4$ | Kill in 22 minutes. |
| $C^4$ | Kill in 39 minutes. |

EXAMPLE XI

In order to test the compositions of the present invention comprising inorganic insecticides and an organic phosphorus-containing insecticide as a contact poison the following run was carried out. Approximately 1 cc. of solution B, which solution was a number of hours old, was placed in a small test tube. The solution was allowed to remain in the tube momentarily after which it was turned out so that the only liquid remaining in the tube was that which still wetted the sides of the tube. Thereafter the tube was inverted over an insect and after 10 minutes kill had been accomplished even though there was practically absence of the liquid insecticide.

EXAMPLE XII

Solutions were prepared as follows:

$A^5$ 0.1 cc. of diethylphosphate in 40 cc. of $H_2O$
$B^5$ 0.1 cc. diethylphosphate+0.1 gm. $Na_2SiF_6$ in 40 cc. water
$C^5$ 0.1 cc. diethylphosphate+0.1 gm. NaF in 40 cc. of water These solutions were mixed with bran (1 cc. per gm.) and fed to grasshoppers.

| Material | Time |
| --- | --- |
| $A^5$ | No kill in 24 hrs. |
| $B^5$ | 105 minutes. |
| $C^5$ | 90 minutes. |

Diethylphosphate is the hydrolysis product produced by most of these phosphorus insecticides such as organic insecticides derived from triethyl phosphate-thionyl chloride reaction product, hexaethyltetraphosphate, tetraethylpyrophosphate. This hydrolysis product is not as toxic as parent compound in itself but mixed with NaF or $Na_2SiF_6$ has considerable toxicity.

Still other examples were carried out wherein the particular organic insecticide combined with the inorganic insecticide was an existing phosphorus-containing insecticide such as the hexaesters referred to in the first part of the present specification. The longevity of these existing phosphorus-containing insecticides was increased in a comparable manner. However, since these existing insecticides were not initially as toxic as the specific phosphorus-containing insecticides derived from the thionyl chloride reaction product, the toxicity of the final insecticide in which the longevity had been increased was not as toxic as the examples described above. When preparing a combined insecticide with existing phosphorus-containing insecticides, small amounts of any of the water-soluble halogen-containing inorganic insecticides may be used in a manner comparable to the methods already described in detail.

It may be seen from the foregoing that I have provided an improved combination insecticide. The invention applies to the increasing of the longevity of any of the phosphorus insecticides of the class indicated which are in themselves extremely useful as insecticides but which through hydrolysis or other action may become nontoxic in a short time. While I prefer to incorporate the fluorides and fluorosilicates of the alkali and alkaline earths as described in detail in the preceding examples, my invention is not limited to these specific compounds. Other addition agents such as the alkali cyanides, the alkali silicon chlorides and the like or mixtures of any of the foregoing may be employed. Likewise, while in the preceding examples I have described the use of certain quantities for the purposes of illustration, smaller or larger quantities may be used. For example, I have found that 0.05 of a gram of the sodium fluorosilicate or other inorganic insecticide produced effective results. On the other hand there is no objection to using several percent of the inorganic material and the choice of the particular amount in any instance may be varied depending on the specific inorganic material being chosen, its water solubility, the length of time toxicity is desired, and related factors.

The materials of the present invention may be used in the form of dust, sprays, solutions, emulsions, or the like. The use of the invention is not restricted to its application against grasshoppers but may be employed against roaches, all plant lice, aphids, spiders, flies, bean beetles, and the like.

What I claim as my invention and desire to be secured by Letters Patent of the United States is:

1. An improved phosphorus-containing insecticide having increased longevity and containing as essential ingredients a phosphate compound from the group consisting of hexa alkyl tetra phosphates and tetra alkyl pyrophosphates the alkyl being of less than four carbon atoms together with a small content of a water-soluble fluorine-containing compound from the group consisting of fluorides and fluorosilicates of the alkali metals, said small content being sufficient when in cooperative relation with said phosphates to impart the increased longevity, but insufficient when said fluorine-containing compound is considered alone to account for the changed toxicity of said insecticide.

2. An improved phosphorus-containing insecticide having increased longevity and containing as essential ingredients a content of hexa ethyl tetra phosphate together with a small content of a water-soluble fluorine-containing compound from the group consisting of fluorides and fluorosilicates of the alkali metals, said small content being sufficient when in cooperative relation with said phosphate to impart the increased longevity, but insufficient when said fluorine-containing compound is considered alone to account for the changed toxicity of said insecticide.

3. An improved phosphorus-containing insecticide having increased longevity and containing as essential ingredients a content of tetra ethyl pyrophosphate together with a small content of a water-soluble fluorine-containing compound from the group consisting of fluorides and fluorosilicates of the alkali metals, said small content being sufficient when in cooperative relation with said phosphate to impart the increased longevity, but insufficient when said fluorine-containing compound is considered alone to account for the changed toxicity of said insecticide.

4. A phosphorus-containing insecticide having increased longevity and comprising as essential ingredients a phosphate insecticide derived from the reaction of a lower alkyl phosphate the alkyl being of less than four carbon atoms with a reagent from the group consisting of sulfur acid halides, phosphorous polyhalides and phosphorous polyoxides together with a content of a water-soluble fluorine-containing compound from the group consisting of fluorides and fluorosilicates of the alkali metals, said small content being sufficient when in cooperative relation with said phosphate to impart the increased longevity, but insufficient when said fluorine-containing compound is considered alone to account for the changed toxicity of said insecticide.

5. The insecticides which contains as essential ingredients triakyl phosphate-thionyl halide reaction product the alkyl being of less than four carbon atoms together with a content of a water-soluble fluorine-containing compound from the group consisting of fluorides and fluorosilicates of the alkali metals.

6. The insecticide which contains as essential ingredients a substantial content of triethyl phosphate-thionyl chloride reaction product together with a water-soluble fluorine-containing compound from the group consisting of fluorides and fluorosilicates of the alkali metals.

7. The insecticide which contains as essential ingredients a substantial content of triethyl phosphate-thionyl halide reaction product together with sodium fluoride.

8. The insecticide which contains as essential ingredients a substantial content of triethyl phosphate-thionyl halide reaction product together with sodium fluorosilicate.

ALAN BELL.

REFERENCES CITED

The following references are of record in the file of this patent:

UNITED STATES PATENTS

| Number | Name | Date |
|---|---|---|
| 1,939,951 | Buchanan | Dec. 19, 1933 |
| 1,998,092 | Migrdichian | Apr. 16, 1935 |
| 2,268,387 | Flenner et al. | Dec. 30, 1941 |
| 2,351,359 | Mitchell | June 13, 1944 |

FOREIGN PATENTS

| Number | Country | Date |
|---|---|---|
| 8,236 | Great Britain | of 1896 |

OTHER REFERENCES

Hall et al.: Industrial and Engr. Chem., pages 694–699, vol. 40, No. 4, April 1948.

Chemical and Engineering News, vol. 23, Sept. 10, 1945, pages 1520–1521.

Mfg. Chem. and Mfg. Perf., Nov. 1944, vol. XV, 11 pages. 391.

J. Econ. Ent., vol. 31, 1938, page 391.